United States Patent
Cagnac

(10) Patent No.: US 9,650,028 B2
(45) Date of Patent: May 16, 2017

(54) BRAKE SYSTEM HAVING AN ELECTRIC SERVO BRAKE

(71) Applicant: Robert Bosch GmbH, Stuttgart (DE)

(72) Inventor: Bastien Cagnac, Cramoisy (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/888,730

(22) PCT Filed: May 2, 2014

(86) PCT No.: PCT/EP2014/058987
§ 371 (c)(1),
(2) Date: Nov. 3, 2015

(87) PCT Pub. No.: WO2014/177691
PCT Pub. Date: Nov. 6, 2014

(65) Prior Publication Data
US 2016/0082940 A1 Mar. 24, 2016

(30) Foreign Application Priority Data

May 3, 2013 (FR) ..................... 13 54092

(51) Int. Cl.
*B60T 13/74* (2006.01)
*F16H 19/04* (2006.01)

(52) U.S. Cl.
CPC ............ *B60T 13/745* (2013.01); *F16H 19/04* (2013.01)

(58) Field of Classification Search
CPC ........ B60T 13/74; B60T 13/745; B60T 7/042; F04B 17/044; F60B 49/12
See application file for complete search history.

(56) References Cited

U.S. PATENT DOCUMENTS

| | | | |
|---|---|---|---|
| 5,031,972 A * | 7/1991 | Steinhauser | B60T 8/489 303/113.2 |
| 2015/0197231 A1* | 7/2015 | Winkler | B60T 13/741 303/3 |
| 2015/0308527 A1* | 10/2015 | Nagel | B60T 13/746 74/89.14 |

(Continued)

FOREIGN PATENT DOCUMENTS

| | | |
|---|---|---|
| DE | 10 2009 001 142 A1 | 8/2010 |
| EP | 2 465 741 A1 | 6/2012 |
| WO | 2011/003643 A1 | 1/2011 |

OTHER PUBLICATIONS

International Search Report corresponding to PCT Application No. PCT/EP2014/058987, mailed Jun. 23, 2014 (German and English language document) (5 pages).

*Primary Examiner* — Bradley King
(74) *Attorney, Agent, or Firm* — Maginot, Moore & Beck LLP

(57) ABSTRACT

A brake system includes a master cylinder, an electric servo brake, and an electric motor. The electric motor drives a screw that engages a pair of helical gears which are each mounted on a respective shaft. Each shaft further mounts a gear that meshes with a respective gear rack. The electric servo brake includes a body that defines rails which guide the gear racks. A lever is supported on each end by one of the gear racks, and is connected to a support via a pivot point. The support lies flat against a side of a reaction disk that lies against a push rod that actuates the master cylinder.

3 Claims, 2 Drawing Sheets

(56) References Cited

U.S. PATENT DOCUMENTS

| | | | |
|---|---|---|---|
| 2016/0101767 A1* | 4/2016 | Charpentier | B60T 7/042 303/15 |
| 2016/0107628 A1* | 4/2016 | Mahnkopf | B60T 13/745 303/115.2 |
| 2016/0185330 A1* | 6/2016 | Lee | B60T 1/10 303/10 |
| 2016/0200309 A1* | 7/2016 | Svensson | B60T 13/686 303/15 |

\* cited by examiner

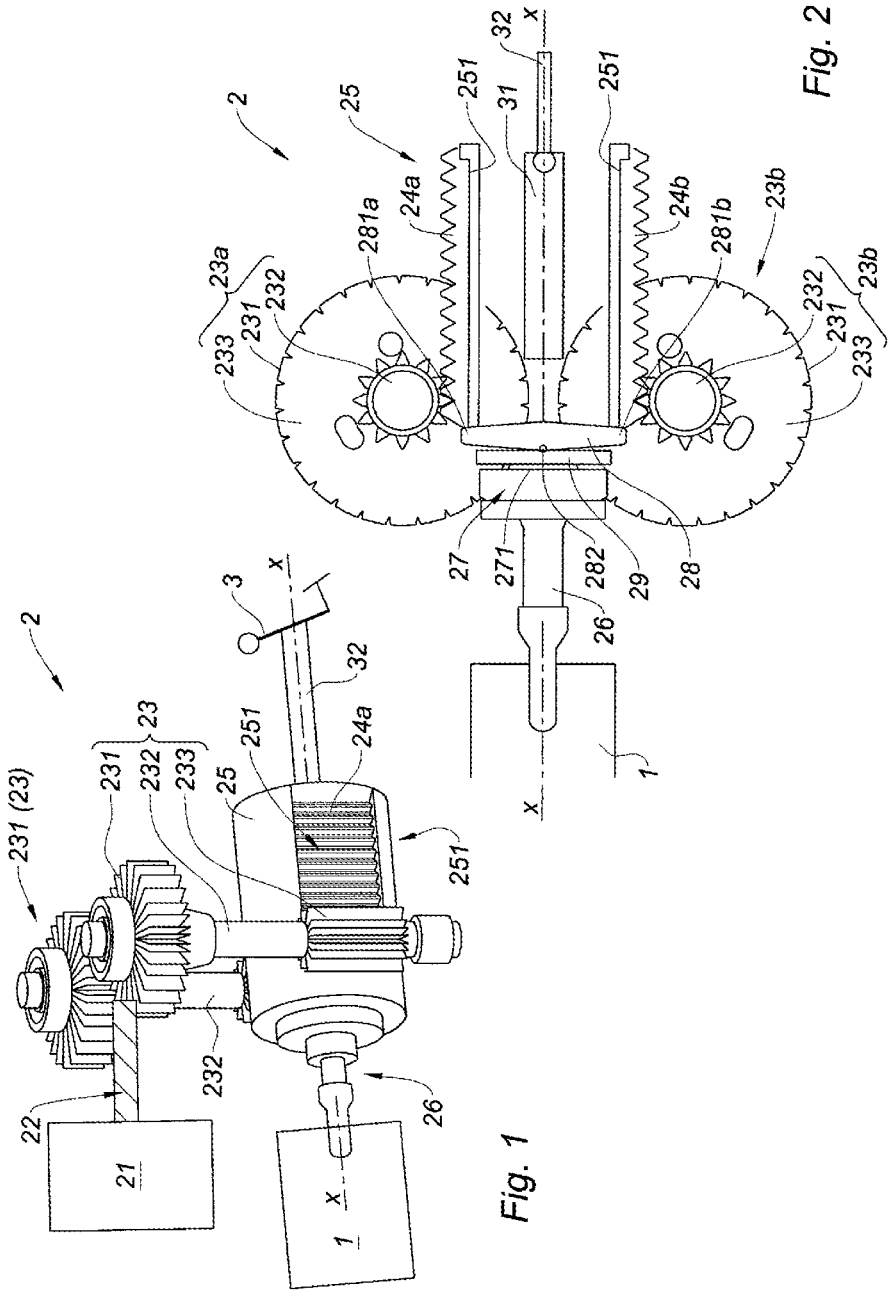

BRAKE SYSTEM HAVING AN ELECTRIC SERVO BRAKE

This application is a 35 U.S.C. §371 National Stage Application of PCT /EP2014/058987, filed on May 2, 2014, which claims the benefit of priority to Ser. No. 1,354,092, filed on May 3, 2014, in France, the disclosures of which are incorporated herein by reference in their entirety.

The present disclosure relates to a brake system comprising a master cylinder and an electric servo brake which contains:

an electric motor driving a screw that engages in twin helical gears which are each carried by a shaft provided with a gear wheel, which cooperates with a gear rack of a pair of gear racks diametrically opposed relative to the axis xx of the electric servo brake, which is also that of the master cylinder, wherein the two gear racks slide the push rod which acts on the master cylinder via the reaction disk, on which the control rod can press directly via the plunger.

BACKGROUND

Brake systems comprising a master cylinder and an electric servo brake, with transmission of the movement of the electric motor to the push rod of the master cylinder by two mechanisms, symmetrical relative to the axis (xx) of the system, for transmitting the movement of the electric motor to the push rod, are known in various forms.

Thus a known system has two gear racks in symmetrical position which slide in rails of the body of the electric servo brake and rest on a dish-like carrier receiving the reaction disk. The purpose of this mounting is to make the gear racks independent of the body of the electric servo brake and avoid an actuation piston, which is accommodated sliding in the body of the electric servo brake and drives the push rods via its reaction disk.

However, this system for transmitting the movement of the electric motor to the push rod of the master cylinder has the disadvantage of not taking into account differences in play, even very slight, between the two symmetrical drive mechanisms containing the gear racks, so that the carrier of the reaction disk is almost necessarily arranged obliquely since, in practice, the two gear racks do not advance strictly equally; the reaction disk is positioned obliquely and this has a negative effect on the reliability of the kinematic chain up to the master cylinder.

FIGS. 3A and B depict this situation diagrammatically.

FIG. 3A shows the electric servo brake 200 of the prior art, comprising a servo brake body 225 which guides two gear racks 224a, 224b in symmetrical positions relative to the axis xx of the system formed by the servo brake and the master cylinder. It has a control rod 232 which is connected to the brake pedal (not shown) and acts on the plunger 231 which controls the servo brake by detecting its movement. The plunger 231 lies against an intermediate piston 240, which is carried by a dish-like carrier 230 receiving the reaction disk 227. In the normal position, the intermediate piston 240 is not in contact with the reaction disk 227.

The dish-like carrier 230 sits in front of the two gear racks 224a, 224b in order to be pushed by these when they are advanced (to the left in FIG. 3a), driven by the twin transmission which has a shaft carrying the spur gear and gear wheels which are themselves driven by the screw of the electric motor (not shown). Under the effect of a stroke difference of the two gear racks 224a, 224b, the carrier 230 of the reaction disk 227 lies obliquely, as shown in FIG. 3b, and the same applies to the reaction disk that rests obliquely against the push rod, which is thus exposed to a transverse force component.

SUMMARY

The object of the present disclosure is to eliminate the disadvantages of the brake system comprising a master cylinder and an electric servo brake, in order to prevent the play of two transmissions with gear racks from affecting the guidance of the push rod.

To this end, the disclosure concerns a brake system of the type described above, wherein the two gear racks are guided in two rails of the body of the electric servo brake, wherein the rails run parallel to the axis xx of the system formed by the master cylinder and the electric servo brake, and a lever, the two ends of which lie on the gear racks, is connected by a rotary point to a carrier which lies flat against the reaction disk, whereby the orientation of the lever and that of the carriers are separated from each other.

The device for transmitting the movement of the electric motor of the servo brake to the gear racks and the push rod makes the movement of the gear racks independent of the contact direction on the reaction disk, which always remains perfectly in the axis (xx) of the servo brake. Thus the independence of the gear racks and the play in the kinematic chain have no effect on the direction of the force exerted on the push rods controlling the master cylinder.

This assembly also has the advantage of guaranteeing a balanced distribution of loads between the two gear racks.

According to a further advantageous feature, the pivot point consists of a ball joint arranged in the axis of the servo brake, or of two pivot points symmetrical relative to the axis, the geometric axis of which is perpendicular to the plane of the gear racks which passes through the axis; this ensures in a simple manner the absence of all transverse components which could be induced in the lever by the movement of the gear racks, so that the only resultant of the loads exerted on the lever is expressed in a thrust in the axis.

According to a further advantageous feature, the pivot points, symmetrical relative to the axis xx, consist of two ball joints or two pins.

According to a further advantageous feature, at least the lever is provided with openings which allow the plunger to act directly on the reaction disk via the carrier.

According to a further advantageous feature, the lever has the form of a rectangular or rounded frame which is connected by two coaxial pivot points, symmetrical to the axis, the geometric axis of which is perpendicular to the plane of the gear racks which passes through the axis.

The various design features of the lever and the carrier constitute simple solutions which prevent the resultant of the forces transmitted from the lever to the carrier from having even slight transverse components, so that the reaction disk is pushed perfectly by a force oriented along the axis xx of the system.

BRIEF OF DESCRIPTION OF THE DRAWINGS

The present disclosure is explained in more detail below with reference to an embodiment of a brake system comprising an electric servo brake, depicted schematically in the enclosed drawings, in which:

FIG. 1 is a diagrammatic overall view of the electric servo brake,

FIG. 2 is a diagrammatic view of the main part of the electric servo brake according to the disclosure.

DETAILED DESCRIPTION

Figure 3A:
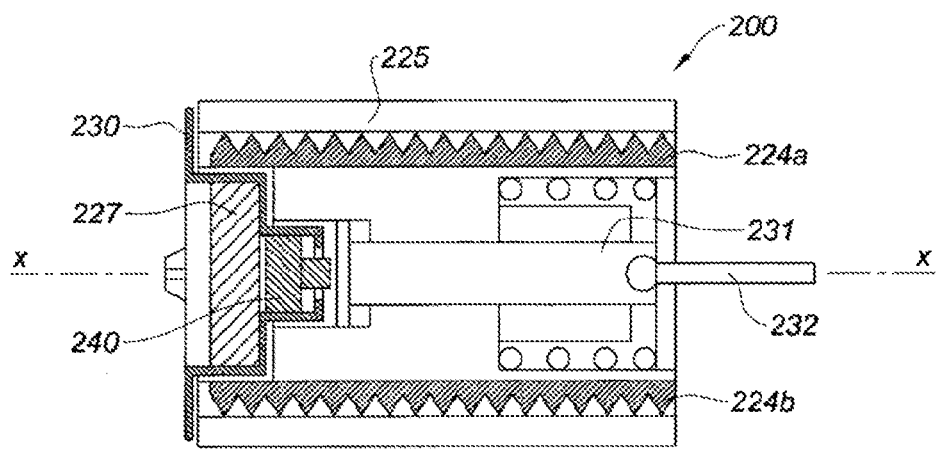
FIG. 3A is a highly diagrammatic view of the electric servo brake according to the prior art.
Figure 3B:
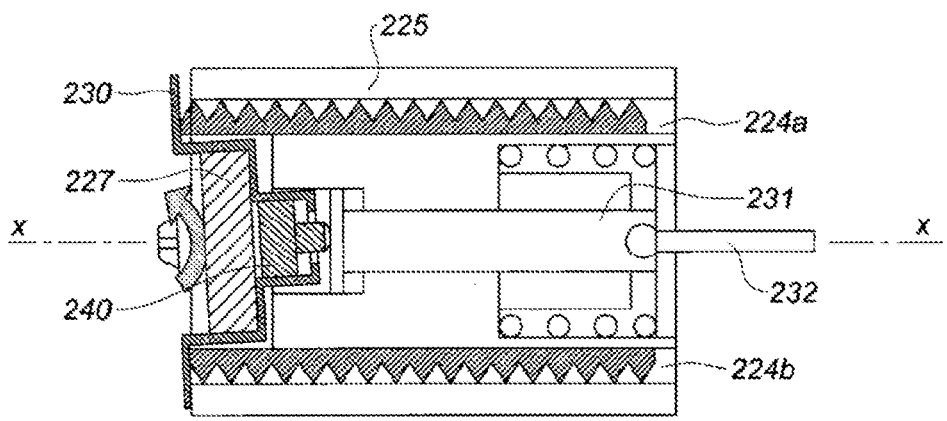
FIG. 3B is a highly diagrammatic view similar to that of FIG. 3A, which however shows the tipping of the carrier of the reaction disk and the resulting tilt of the reaction disk.

FIG. 1 shows an overall view of a brake system with master cylinder 1 and electric servo brake 2 according to the disclosure, wherein the master cylinder 1 and the operating pedal 3 are indicated highly diagrammatically.

The electric servo brake 2 consists of an electric motor 21, the output shaft of which carries a screw 22 in order to transmit the torque of the motor symmetrically through two transmissions 23a, 23b, symmetrical relative to the axis xx of the brake system (master cylinder and electric servo brake).

The brake pedal 3 is on the right in the figure (back) and the master cylinder 1 is on the left in the figure (front). The transmissions 23a, 23b of the electric motor consist of two helical gears 231, each carried on a shaft 232 which is provided with a respective spur gear 233 that cooperates with a respective gear rack 24a, 24b. The two gear racks 24a, 24b (only one of which can be seen in FIG. 1) are accommodated sliding in guides 251 of the body 25 of the servo brake 2. The gear racks 24a, 24b lie on the reaction disk 27, which comes against the push rod 26 via a lever 28 and a carrier 29 which is shown in detail in FIG. 2, and the push rod 26 actuates the master cylinder 1.

According to FIG. 2, the connection between the reaction disk 27, carried by the push rod 26, and the gear racks 24a, 24b of the twin transmission 23, consists of a lever 28, the two ends 281a, 281b of which are connected or each carried by a gear rack 24a, 24b. This lever 28 is carried by a pivot point 282 of the carrier 29 which itself lies flat against the reaction disk 27. The lever 28 and the reaction disk 27 are thus connected by a rotary point 282 which forms a hinge with an axis perpendicular to the plane of FIG. 2, or is comparable to a ball joint system which allows the pivot movement of the lever 28 relative to the carrier 29 independently. The carrier 29 remains perpendicular to the axis xx of the system in the plane of the contact surface 271 of the reaction disk 27. Ideally, the pivot point 282 is a ball joint arranged in the axis xx of the servo brake, so that the travel differences of the pushed gear racks 24a, 24b do not influence the resultant of the loads which are oriented in axis xx and press with no transverse component on the carrier 29 and hence on the reaction disk 27.

According to another embodiment, the pivot point 282 consists of two pivot points, symmetrical relative to the axis xx, and the geometric axis running through these two symmetrical pivot points 282 is perpendicular to the plane of the gear racks 24a, 24b passing through the axis xx.

In this case too, the pivot points 282 may be ball joints or shafts.

The lever 28 and its carrier 29 are hollowed out around the axis (xx) in order to allow passage of the plunger 31 along the axis (xx), the plunger being connected to the control rod 32 coming from the brake pedal 3; in the case of a hinge 282 consisting of a ball joint which lies in axis xx, the lever 28 has at least two openings through which pass the legs of a bracket which lies on the carrier 29 and allows the plunger 31 to be received. In all versions considered above, the plunger 31 may then, on failure of the electric servo brake, press on the reaction disk 27 and slide the push rods 26 in order to actuate the master cylinder 1 and control the brakes directly.

According to one exemplary embodiment, the lever 28 has the form of a rectangular or rounded frame which is connected by two coaxial hinge pins which form the two pivot points 282, symmetrical relative to the axis xx to the carrier 29.

To summarize, the lever 28 and its carrier 29 allow the balancing of the loads between the two gear racks 24a, 24b, which guarantees the good operation and reliability of the brake system.

The invention claimed is:

1. A brake system comprising:
   a master cylinder that defines a first axis; and
   an electric servo brake which includes:
      a body that defines a pair of guides running parallel to the first axis;
      a reaction disc;
      a push rod that acts on the master cylinder;
      a plunger;
      a control rod configured to press on the reaction disc via the plunger;
      a carrier that lies flat against the reaction disc;
      a pair of gear racks guided in the pair of guides and diametrically opposed relative to the first axis, the pair of gear racks configured to slide the push rod to act on the master cylinder via the reaction disk;
      a pair of gear wheels that meshes with the pair of gear racks;
      a pair of shafts that supports the pair of gear wheels;
      a pair of helical gears mounted on the pair of shafts;
      a screw that engages the pair of helical gears;
      an electric motor that drives the screw; and
      a lever that has two ends lying on the pair of gear racks, and that is connected by a rotary pivot point to the carrier such that an orientation of the lever and an orientation of the carrier are independent from each other.

2. The brake system as claimed in claim 1, wherein:
   the pivot point includes (i) a ball joint arranged in the first axis of the servo brake, or (ii) two pivot points arranged symmetrically relative to the first axis, and
   a second axis of the pivot point is perpendicular to a plane of the pair of gear racks which passes through the first axis.

3. The brake system as claimed in claim 2, wherein the two pivot points arranged symmetrically relative to the first axis includes two ball joints or two pins.

* * * * *